(No Model.)
W. T. GRUNTLER.
TRACK CLEARER.
No. 301,815. Fig. 1 Patented July 8, 1884.
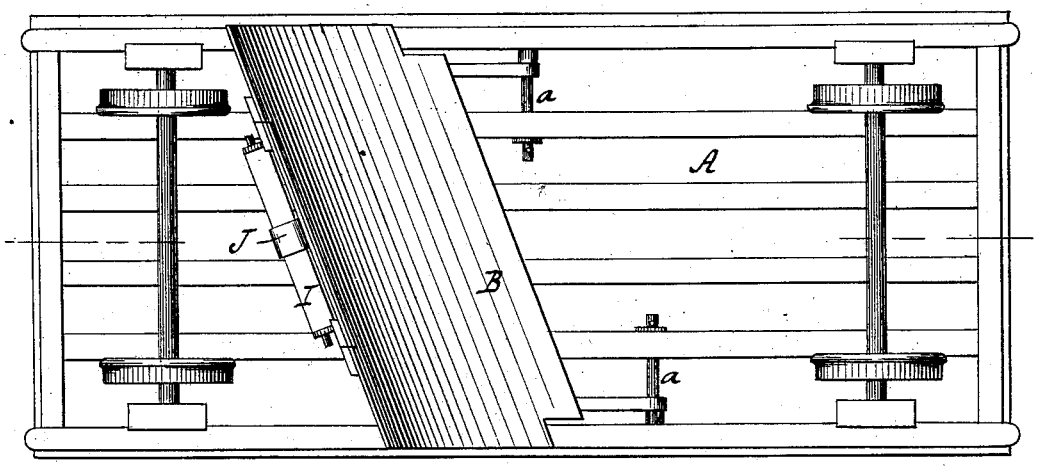
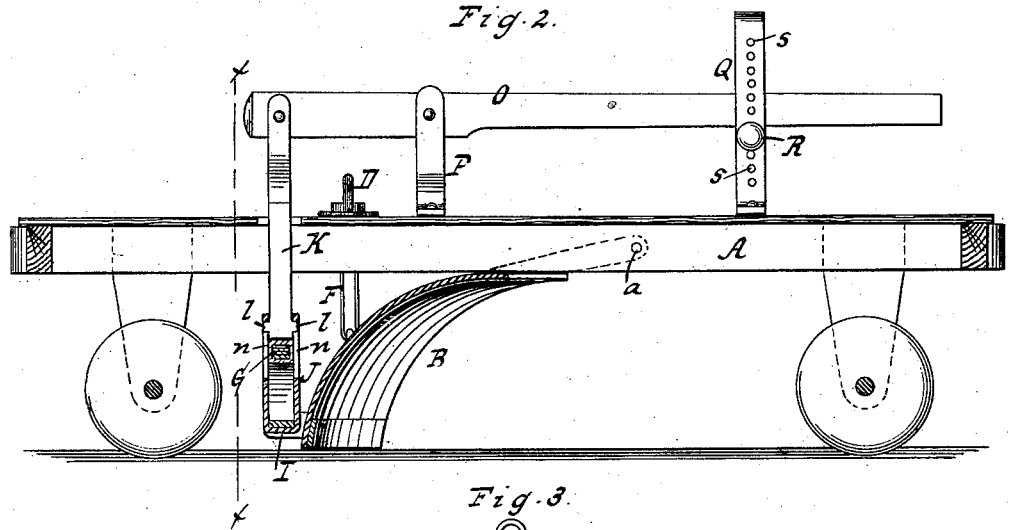
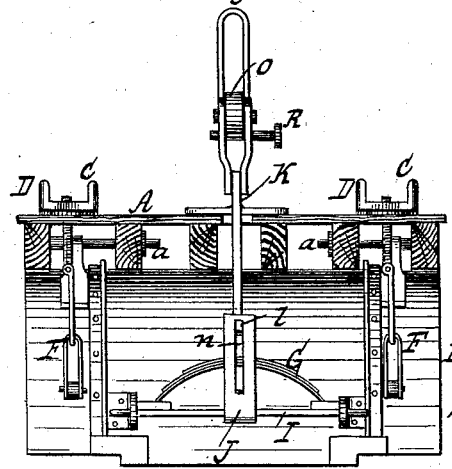
WITNESSES:
William Miller
Otto Hufeland
INVENTOR
William T. Gruntler
BY
Van Santvoord & Hauff
his ATTORNEYS

UNITED STATES PATENT OFFICE.

WILLIAM T. GRUNTLER, OF TIVOLI, NEW YORK.

TRACK-CLEARER.

SPECIFICATION forming part of Letters Patent No. 301,815, dated July 8, 1884.

Application filed April 10, 1884. (No model.)

*To all whom it may concern:*

Be it known that I, WILLIAM T. GRUNTLER, a citizen of the United States, residing at Tivoli, in the county of Dutchess and State of New York, have invented new and useful Improvements in Track-Clearers, of which the following is a specification.

My invention relates to that class of track-clearers in which a plow is hinged to the truck of a car, to be adjusted in relation to the ground as described in my Letters Patent No. 204,031, dated May 21, 1878.

The novel features of my present invention are hereinafter fully described, and illustrated in the accompanying drawings, in which—

Figure 1 is an inverted plan view. Fig. 2 is a longitudinal section. Fig. 3 is a cross-section on the line $x\,x$, Fig. 2.

Similar letters indicate corresponding parts.

The letter A designates the car-truck, and B the plow, the latter being hinged to the truck by means of horizontal pins $a$, so that it is capable of adjustment in relation to the ground; and it consists of a blade which is curved in cross-section, and extends obliquely to the draft-line of the truck. The shape and position of the plow, however, form no part of my present invention.

The letter C designates eyebolts—in this example two in number—which pass through the truck-platform, and on which are fitted nuts D above the platform for supporting the same on the truck. The plow B is connected to the eyebolts C by a flexible medium, consisting in this example of links F, and consequently the position of the plow can be regulated by means of the nuts, while it is capable of an upward movement, thus adapting itself to any fixed obstacle that may be presented to it in use. A spring, G, is arranged to act on the plow with a tendency to oppose its upward movement; and in order that this spring may exert a uniform pressure in any position of the plow it is made adjustable in relation to the plow by the following means: On the back of the plow is a horizontal bar, I, against which the spring impinges at its ends, the spring being bow-shaped, and which is fitted into a clip, J, to which is connected a vertical rod, K, by means of spurs $l$ of the rod entering vertical slots $n$ of the clip. The spring G passes through the clip J, and abuts against the lower end of the rod K on the back, so that if the rod is held stationary it acts on the plow through the spring with a tendency to check an upward movement of the plow. To the upper end of the rod K is connected a lever, O, which has its fulcrum in a standard, P, and is adjustably secured in a guide, Q, as by means of a pin, R, fitted into holes S of the guide, so that this lever is a medium for fastening the rod in different positions, which is requisite to the adjustment of the spring.

What I claim as new, and desire to secure by Letters Patent, is—

1. The combination, substantially as hereinbefore described, with the car-truck, of the plow hinged to the truck for its adjustment in relation to the ground, the eyebolts having nuts fitted thereon for supporting the same on the truck, the flexible connection for the plow with the eyebolts, and the check-spring acting on the plow.

2. The combination, substantially as hereinbefore described, with the car-truck, of the plow hinged to the truck for its adjustment in relation to the ground, the eyebolts having nuts fitted thereon for supporting the same on the truck, the flexible connection of the plow with the eyebolts, the check-spring acting on the plow, and a means for adjusting the spring in relation to the plow.

3. The combination, substantially as hereinbefore described, with the car-truck, of the plow hinged to the truck for its adjustment in relation to the ground, a bolt or bolts adjustable upward and downward on the truck, a flexible connection or connections between the adjustable bolt or bolts and the plow, the horizontal bar on the back of the plow, the clip having the bar fitted therein, the vertical rod connected to the clip by means of spurs entering slots of the clip, the spring passing through the clip to abut against the lower end of the rod, and a means for fastening the rod in different positions.

4. The combination, substantially as hereinbefore described, with the car-truck, of the plow hinged to the truck for its adjustment in relation to the ground, a bolt or bolts adjustable upward and downward on the truck, a flexible connection or connections between the adjustable bolt or bolts and the plow, the horizontal bar on the back of the plow, the clip having the bar fitted therein, the vertical rod connected to the clip by means of spurs entering slots of the clip, the spring passing through the clip to abut against the lower end of the rod, the lever connected to the rod, the guide for the lever, and a means for adjustably securing the lever in the guide.

In testimony whereof I have hereunto set my hand and seal in the presence of two subscribing witnesses.

WILLIAM T. GRUNTLER. [L. S.]

Witnesses:
HORACE E. KELLEY,
JOHN KING.